(12) United States Patent
Rendon

(10) Patent No.: US 9,181,412 B2
(45) Date of Patent: Nov. 10, 2015

(54) COMPOSITION FOR THE DEGRADATION OF PLASTIC

(71) Applicant: Manuel Rendon, Caracas (VE)

(72) Inventor: Manuel Rendon, Caracas (VE)

(73) Assignee: Bioplast, LLC, Miami Springs, FL (US)

( * ) Notice: Subject to any disclaimer, the term of this patent is extended or adjusted under 35 U.S.C. 154(b) by 0 days.

(21) Appl. No.: 14/159,075

(22) Filed: Jan. 20, 2014

(65) Prior Publication Data

US 2015/0203666 A1   Jul. 23, 2015

(51) Int. Cl.
| | |
|---|---|
| *C08J 11/16* | (2006.01) |
| *C08J 11/20* | (2006.01) |
| *C08J 11/24* | (2006.01) |
| *C08J 11/10* | (2006.01) |
| *C08L 1/02* | (2006.01) |

(52) U.S. Cl.
CPC ............... *C08J 11/105* (2013.01); *C08J 11/16* (2013.01); *C08J 11/20* (2013.01); *C08J 11/24* (2013.01); *C08L 1/02* (2013.01); *C08L 2201/06* (2013.01)

(58) Field of Classification Search
CPC ......... C08L 11/16; C08L 11/20; C08L 11/22; C08L 11/24; C08L 11/105
USPC .................................................. 521/40–49.8
See application file for complete search history.

(56) References Cited

U.S. PATENT DOCUMENTS

| | | | | |
|---|---|---|---|---|
| 5,298,540 | A  * | 3/1994 | Pauquet et al. ................. | 524/94 |
| 6,545,061 | B1 * | 4/2003 | Murdoch ........................ | 521/48 |
| 2011/0124889 | A1 * | 5/2011 | Saladino et al. ............. | 549/477 |
| 2012/0029228 | A1 * | 2/2012 | Coszach et al. .............. | 560/179 |
| 2012/0083542 | A1 * | 4/2012 | Muller ........................... | 521/47 |
| 2012/0142958 | A1 * | 6/2012 | Coszach et al. .............. | 560/179 |
| 2012/0190800 | A1 * | 7/2012 | Felice et al. .................. | 525/419 |

OTHER PUBLICATIONS

Berini (Oxidation of aromatic aldehydes and ketones by H2O2/CH3ReO3 in ionic liquids: a catalytic efficient reaction to achieve dihydric phenols. Tetrahedron, 2005, 61, pp. 1821-1825).*
Bartolome (Chapter 2: Recent Developments in the Chemical Recycloing of PET. InTech: Material Recycling Trends and Perspectives. Mar. 2012. 21 pages).*
Yoshida (Oxygenation of Bisphenol A to Quinones by Polyphenol Oxidase in Vegetables. Journal of Agricultrual and Food Chemistry. 2002, 50, pp. 4377-4381).*

* cited by examiner

*Primary Examiner* — Brieann R Fink
(74) *Attorney, Agent, or Firm* — Christian Sanchelima

(57) ABSTRACT

A composition for the degradation of plastic in the form of an additive used during the manufacturing of plastic. The composition being comprised of a predetermined amount of heptane, cellulose, methyl rhenium trioxide, butylated hydroxytoluene, and polyphenol oxidase. The additive can be selectively programmed to cause the plastic to begin disintegrating at a predetermined time.

2 Claims, No Drawings

COMPOSITION FOR THE DEGRADATION OF PLASTIC

BACKGROUND OF THE INVENTION

1. Field of the Invention

The present invention relates to a composition and, more particularly, to a composition for the degradation of plastic.

2. Description of the Related Art

Most plastics include polluting substances that are not biodegradable. Several formulations for environmentally-friendly compositions have been created in the past. None of them, however, use an undercover additive derived from the plastic targeted for degradation, hidden in a chemical cloak synthesized via the same plastic targeted for degradation's polymer structure itself, which is partially dissolved to create a cover for a Nano-programmed chemical addition on the inside. When activated this additive first decomposes the current polymer links between monomers and subsequently supplant them for weaker links susceptible to degradation through water, oxidation and/or anaerobic/aerobic biodegradation. In addition, none of them include a polymerization process that opens the time window for Nano programmable matter to catalyze the needed reaction to reassign the links structure on the plastics, including oil-derived high density plastics, without compromising its thermo stability, thermo plasticity, physical, mechanical, chemical stability and quality overall standards.

SUMMARY OF THE INVENTION

It is one of the main objects of the present invention to provide a composition for the formation of plastics susceptible to degradation.

It is another object of this invention to provide a composition for an additive which adds the degradable variable to oil-derived high density plastics and the set of plastics in general with a melting point under 500° C.

It is another object of this invention to provide a composition that uses

Nano additives, which are very small and inexpensive yet, can alter a huge amount of polymer.

It is another object of this invention to provide a composition for a chemical structure that works as a cloak for undercover Nano additives to catalyze a homogeneous blend between those and the plastic targeted for degradation.

It is another object of this invention to provide a composition that is made of a 100% homogeneous blend that leaves no carbon footprint.

It is another object of this invention to provide a composition to program the degradation time with an inverse factor additive/plastic's mass, whose variation changes the plastic targeted for degradation's obsolescence time-ratio.

It is still another object of the present invention to provide a composition that stabilizes a blend between a large molecule, such as a polymer, and a small one, such as the present additive, while retaining the original molecular structure, quality, thermo plasticity, and other physical, thermic, and mechanical characteristics.

It is yet another object of this invention to provide such a composition that is inexpensive to produce.

Further objects of the invention will be brought out in the following part of the specification, wherein detailed description is for the purpose of fully disclosing the invention without placing limitations thereon.

DETAILED DESCRIPTION OF THE EMBODIMENTS OF THE INVENTION

In its basic format, the present invention comprises the following substances: heptane, cellulose, methyl rhenium trioxide, butylated hydroxytoluene, and polyphenol oxidase.

To properly make the composition, a portion of sample plastic must be partially desynthesized using heptane. The resulting mix is then combined at 75% of the sample plastic's melting temperature with a precise measure of cellulose, methyl rhenium trioxide, butylated hydroxytoluene, and polyphenol oxidase. The resulting composition is then added as an additive to a predetermined plastic production demand. The resulting plastic, homogenized with the additive subject of the present invention, has weaker links susceptible to oxidation, water degradation, and biodegradation. The types of plastics that can be treated with the present composition are those with a melting temperature below 500° C.

The present invention also works on oil-derived high density polymers. The heptane used in the present invention partially breaks the polymer's structure while retaining the physical characteristics of the original plastic taken for sample in the additive composite. The present invention then uses cellulose, methyl rhenium trioxide, butylated hydroxytoluene, and polyphenol oxidase to replace those broken links for weaker links that are more susceptible to environmental-degrading elements. Every molecule in the plastic is homogenized with the additive. The other ingredients also act to reduce the potency of the heptane so that the plastic degrades over time and not all of a sudden, as heptane has the potential of doing. The additive can be programmed to disintegrate the plastic at a predetermined time. The obsolescence time is addressed stoichiometrically, and depends on the plastic's density. Each type of plastic has a different obsolescence time, yet relating the density of the plastic with the inverse factor additive/plastic's mass, the obsolescence time can be controlled. A higher factor for a shorter time and a lower factor for a longer time.

The following discloses the ratios required to make the additive composition subject of the present invention:

The additive's obsolescence time programmability is given by the following composition:

The percentages are related to molecular weight (g/mol),
  SP=Sample plastic. Different types of plastic will require a different amount of heptane in the first step.
  CA, CB, CC and CD=Compound A, B, C and D
  BA=Additive subject of the present invention
  PD=Amount of actual production demand of the plastic that was sampled $$SP<100\%>+\text{Heptane Volumetric in solution approach until solute }(SP)\text{ partially dissolves into the solvent (Heptane)}=CA \quad (1)$$

This means that heptane is added to 100% of the sample plastic until the sample plastic partially dissolves into the Heptane.

$$CA<100\%>+\text{Cellulose}<100\%>=CB \quad (2)$$

This means that cellulose is added to CA until the molecular weight of the quantity of cellulose being added equals the molecular weight of CA.

$$CB<100\%>+\text{Methyl rhenium trioxide}<50\%>=CC \quad (3)$$

This means that methyl rhenium trioxide is added to CB until the molecular weight of the quantity of methyl rhenium trioxide being added equals half the molecular weight of CB.

$$CC<100\%>+\text{Butylated hydroxytoluene}<15\%>=CD \quad (4)$$

This means that butylated hydroxytoluene is added to CC until the molecular weight of the quantity of butylated hydroxytoluene being added equals 15% of the molecular weight of CB.

$$CD<100\%>+\text{Polyphenol oxidase}<75\%>=BA \quad (5)$$

This means that polyphenol oxidase is added to CD until the molecular weight of the quantity of polyphenol oxidase being added equals 75% of the molecular weight of CD.

$$BA<0.1\%>+PD<100\%>=\text{Final commercial-production plastic} \quad (6)$$

SP=clients' needs. (0.1% is equivalent to an inverse factor (additive/plastic's mass) of 1.

BA equals the final additive. Once BA is created, 0.1% of the molecular weight of the amount of plastic desired to be produced is added in the form of the additive (BA).

The above molecular weight percentages disclose the most effective amount known to the applicant. However, each molecular weight percentage can still work in a +/−5% range, albeit not as effectively. To illustrate, the percentage of the molecular weight in cellulose added can be within the range of 90% and 100% and still function. Similarly, the percentage of methyl rhenium trioxide can be in the range of 45%-55% and function. The percentage of butylated hydroxytoluene can be within the range of 10%-20% and still function and the percentage of polyphenol oxidase can be within the range of 70%-80% and still function. The amount of additive to be added to the amount of plastic sought to be produced can range between 0.09% and 1%.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A composition for degrading a preselected type of plastic, comprising:
    A) a predetermined amount of a preselected type of plastic dissolved into a predetermined amount of heptane until said plastic partially solvents in said heptane;
    B) from 90% to 100% of the molecular weight of the previous solute of cellulose in grams;
    C) from 45% to 55% of the molecular weight of the previous combination of methyl rhenium trioxide in grams;
    D) from 10% to 20% of the molecular weight of the previous combination of butylated hydroxytoluene in grams; and
    E) from 70% to 80% of the molecular weight of the previous combination of polyphenol oxidase in grams.

2. A composition for degrading plastic, consisting essentially of:
    A) a predetermined amount of a preselected type of plastic dissolved into a predetermined amount of heptane until said plastic solvents in said heptane;
    B) from 90% to 100% of the molecular weight of the previous solute of cellulose in grams;
    C) from 45% to 55% of the molecular weight of the previous combination of methyl rhenium trioxide in grams;
    D) from 10% to 20% of the molecular weight of the previous combination of butylated hydroxytoluene in grams; and
    E) from 70% to 80% of the molecular weight of the previous combination of polyphenol oxidase in grams.

* * * * *